Aug. 12, 1958  G. A. LYON  2,847,096
WHEEL STRUCTURE
Filed Jan. 19, 1953  3 Sheets-Sheet 1
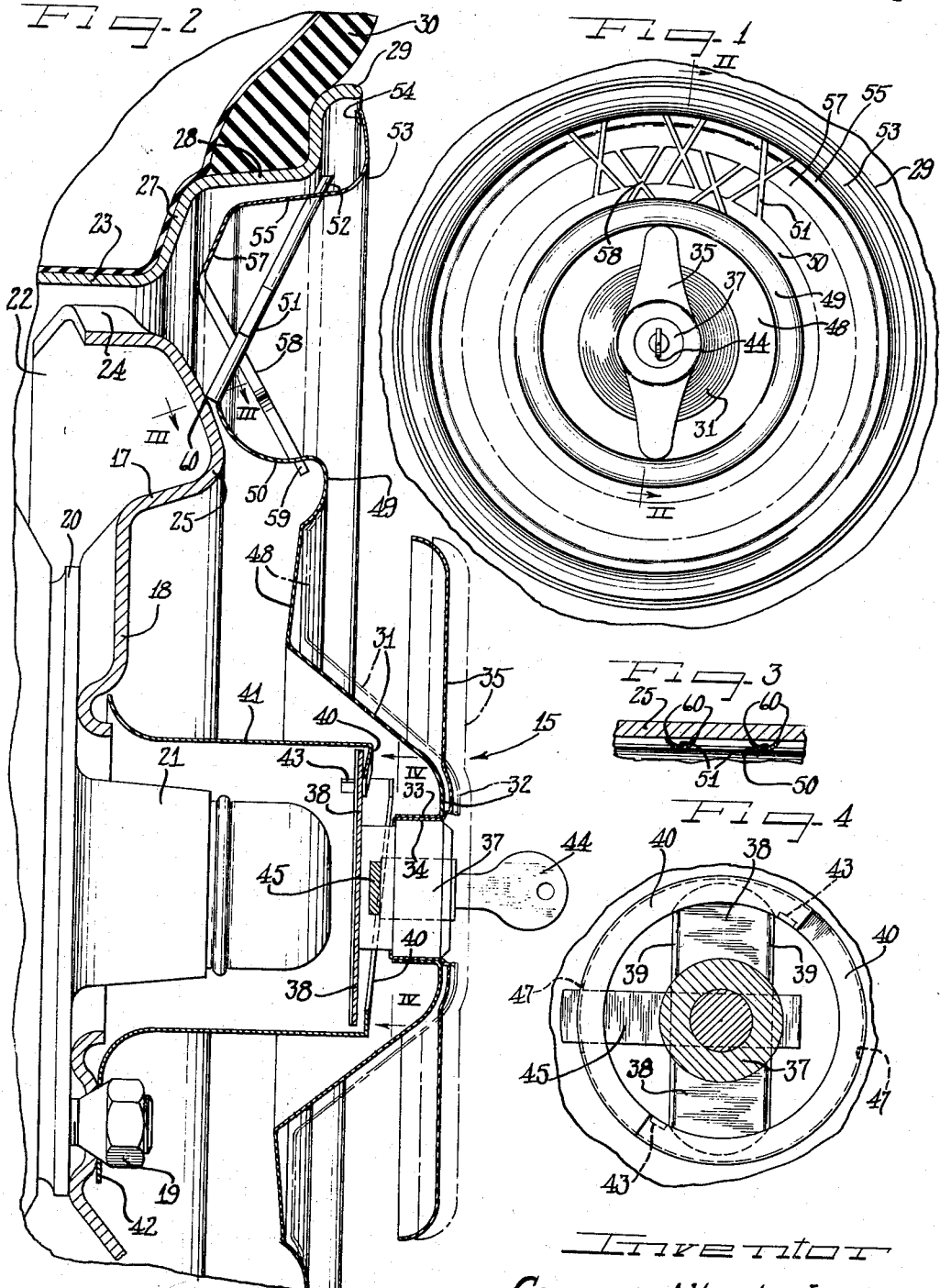
Inventor
George Albert Lyon Aug. 12, 1958     G. A. LYON     2,847,096
WHEEL STRUCTURE Filed Jan. 19, 1953     3 Sheets-Sheet 2

Inventor
George Albert Lyon

Aug. 12, 1958  G. A. LYON  2,847,096
WHEEL STRUCTURE
Filed Jan. 19, 1953  3 Sheets-Sheet 3
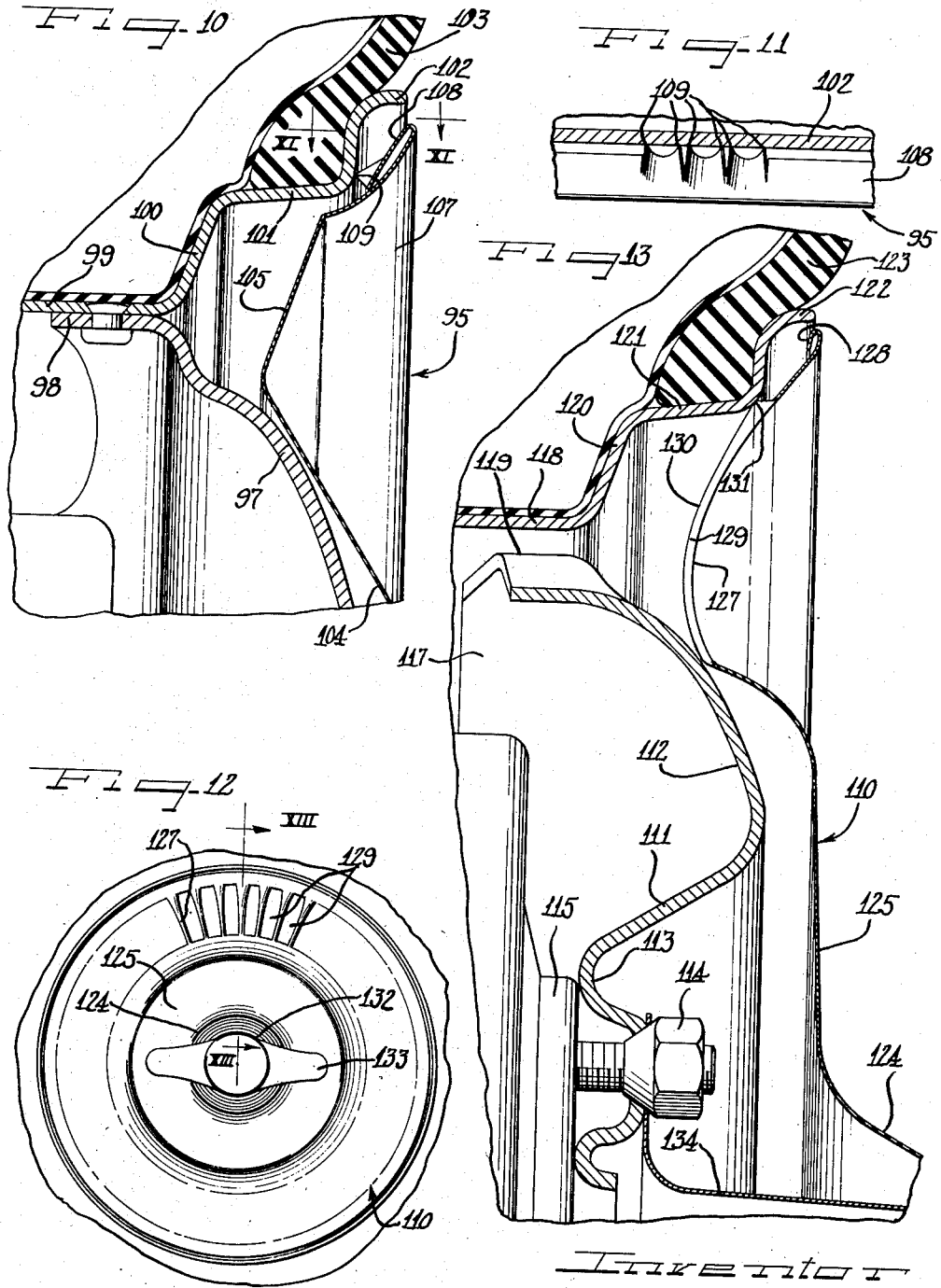
Inventor
George Albert Lyon
by Hill, Sherman, Meroni, Gross & Simpson
Attys United States Patent Office 2,847,096
Patented Aug. 12, 1958

2,847,096

WHEEL STRUCTURE

George Albert Lyon, Detroit, Mich.

Application January 19, 1953, Serial No. 331,951

21 Claims. (Cl. 188—264)

The present invention relates to improvements in wheel structures and more particularly concerns the ornamental and protective covering of the outer sides of vehicle wheels.

An important object of the present invention is to provide an improved wheel structure having a knock-off type wheel cover at the outer side thereof held effectively against undesirable movement on the wheel in service.

Another object of the invention is to provide an improved wheel structure having thereon covering means normally tending to rotate on the wheel due to operating torque in service, but effectively restrained against such turning by the manner in which the cover is secured to the wheel.

Still another object of the invention is to provide improved means in a vehicle wheel cover for holding a cover against turning on the wheel.

Yet another object of the invention is to provide an improved flexibly resilient as well as turn-free attachment of wheel covers to the outer sides of vehicle wheels.

Other objects, features and advantages of the present invention will be readily apparent from the following detailed description of certain preferred embodiments thereof taken in conjunction with the accompanying drawings in which:

Figure 1 is a side elevational view of a vehicle wheel embodying features of a wheel structure embodying features of the invention;

Figure 2 is an enlarged diametrical sectional view taken substantially on the line II—II of Figure 1;

Figure 3 is a fragmentary sectional detail view taken substantially on the line III—III of Figure 2;

Figure 4 is a fragmentary sectional detail view taken substantially on the line IV—IV of Figure 2;

Figure 5 is a side elevational view of a vehicle wheel embodying a modified cover construction;

Figure 6 is a radial, enlarged sectional view taken substantially on line VI—VI of Figure 5;

Figure 7 is a fragmentary sectional detail view taken substantially on the line VII—VII of Figure 6;

Figure 8 is a sectional detail view similar to Figure 7 but showing a modification;

Figure 9 is a detail sectional view similar to Figures 7 and 8 but showing a further modification;

Figure 10 is a fragmentary radial sectional view through a wheel structure showing still another modified form of wheel cover;

Figure 11 is a fragmentary sectional detail view taken substantially on line XI—XI of Figure 10;

Figure 12 is a side elevational view of a wheel structure showing another modified form of the invention; and Figure 13 is an enlarged radial sectional view taken substantially on the line XIII—XIII of Figure 12.

In the form of the invention shown in Figures 1 and 2, a wheel cover 15 is applied to the outer side of a vehicle wheel comprising a body 17 which may be of the disk spider type having a central dished bolt on flange 18 adapted to be secured as by means of bolts 19 to a hub flange 20 of a vehicle axial structure from which projects axially outwardly through the usual central opening in the wheel body an axle hub 21.

At its outer margin the wheel body 17 has an attachment flange 22 by which it is secured to a base flange 23 of a tire rim. At suitable intervals the flange 22 is inset to afford wheel openings 24. Intermediately the wheel body 17 is annularly bulged axially outwardly to provide a reenforcing nose bulge or rib 25.

The tire rim may be of the drop center type having an outer side flange 27, an intermediate flange 28 and a terminal flange 29, the flanges cooperating to support a pneumatic tire and tube assembly 30.

By preference the cover 15 is of the knock-off type. That is, it is constructed and arranged to be applied to the wheel by turning a central attachment member into engagement with a retaining device on the wheel, while to remove the cover the central attachment device is turned in reverse to disengage it from the retaining means on the wheel. To this end, the cover 15 comprises a central cover member 31 having a crown portion 32 formed with a central aperture defined by an axially inwardly extending flange 33. Relatively rotatably telescopically extending through the flange 33 is a cylindrical flange portion 34 of a diametrically oppositely elongated handle member 35. Supported in fixed relation within the flange 34 is a latching and lock device 37, the body of which projects axially inwardly beyond the flange assembly 33, 34 and carries an arm structure including diametrically oppositely extending latching arms 38 having respective opposite cam edges 39 and engageable latchingly with respective symmetrically constructed opposite generally radially inwardly direct spirally axially inwardly sloping outer end cam flanges 40 (Figs. 2 and 4) on a retaining member 41 carried by the wheel body 17. The member 41 is preferably a cylindrical sheet metal shell that has an inner end base structure 42 secured to the wheel by means of the attachment bolts 19 at the bolt on flange. The internal diameter of the retaining member 41 is such as to accommodate the wheel hub 21 therein.

In attaching the cover to the wheel, the latch arms 38 are brought into position opposite the respective outer ends of the retaining flanges 40 and the arms are then turned against the inner cam flange surfaces of the flanges 40 by turning the handle 35 until the arms 38 have come to a stop against axially inwardly extending stop flanges 43 at the inner end portions of the flanges 40.

If desired, the body 37 can include a key operated lock operable by means of a removable key 44 to actuate a longitudinally reciprocable locking bar or bolt 45 engageable selectively in respective diametrically opposite keeper slots 47 in the wall of the member 41.

According to the present invention, the cover 15 is attachable not only under resilient tension to the wheel but also against turning on the wheel in service, and is equipped to enable relatively free circulation of air therethrough and through the wheel openings 24. To this end, the central cover member 31 preferably slopes axially inwardly and radially outwardly from the crown portion 32 and merges with an intermediate substantially diaphragm-like generally radially extending intermediate portion 48 and radially outwardly thereof joins an annular generally rib-like axially outwardly projecting substantially stiffer portion 49 which in assembly with the wheel overlies the nose bulge 25 of the wheel body.

Herein the cover 15 is preferably of the spoke wheel simulating type. Accordingly, the intermediate rib portion 49 of the cover has at the radially outer side thereof a generally axially inwardly and radially outwardly directed flange portion 50 provided with spoke-like extensions 51 at its outer edge. The spoke extensions 51 may be individually elongated elements or, as shown, generally X-shaped structures provided with crossing legs extending generally radially and axially outwardly and having terminal lugs 52. The legs of the spoke extensions 51 are preferably rounded off, that is of convex cross-section.

Cooperatively related to the inner cover member 31 is an outer annular cover member or portion 53 constructed to lie adjacent to but in spaced relation to the tire rim and with the outer marginal extremity portion of the member 53 overlying the terminal flange 29. At its extremity the member 53 is provided with an underturned reenforcing and finishing flange 54 lying adjacent to the extremity of the terminal flange. The outer marginal portion of the member 53 is preferably of rib-like convex cross-section merging with a generally axially inwardly extending intermediate flange 55 to lie opposite the intermediate flange 28 of the tire rim and joining generally radially inwardly extending but somewhat axially inwardly oblique inner marginal flange 57. Extending from the inner edge of the flange 57 is a series of generally radially inwardly and axially outwardly sloping spoke extensions 58, which, similarly to the spoke extensions 51, are preferably of X-shape or arrangement.

In assembly, the spoke extensions 51 and 58 are disposed in alternating relation to provide a symmetrical arrangement. The terminals 52 of the spoke elements 51 are secured appropriately to the flange 55 of the outer cover member, adjacent to juncture thereof with the outer rib-like marginal portion of said outer member. The spoke extensions 58 have terminals 59 which are appropriately secured to the flange portion 50 of the inner cover member adjacent juncture thereof with the rib-like portion 49. By preference the respective cover members are provided with appropriate apertures into which the respective terminals 52 and 59 extend in assembly.

It will be observed from Figure 2 that the openings between the spoke elements 51 and 58 are generally opposite the wheel openings 24 so that circulation of air can occur through the cover and the wheel openings.

In order to retain the cover assembly against rotating on the wheel in service, means are preferably provided which when the cover is tightened down against the wheel will effect a biting interengagement between one of the wheel parts and thus retain the cover against turning. Herein this is accomplished by providing the inner cover member 31 with such means in the form of respective pairs of spurs 60 (Figs. 2 and 3) at the inner end portions of the spoke elements 51 of the inner cover member. The spurs 60 are provided at the corners defined by the convergent edges at the generally axially inwardly turned sides of the spokes 51 adjacent juncture of the spokes with the flange 50 of the inner cover member. The disposition of the spur corners 60 is such that when the cover is applied to the wheel, the spurs 60 will engage retainingly against the radially outer side of the nose bulge 25 of the wheel body. The spurs 60 are preferably the only direct contact of the cover with the wheel.

As the cover is placed under axially inward tensioned flexure as for example from the dash outline position of Figure 2 to the full line position of Figure 2, by turning down the latching mechanism as hereinbefore explained, the spurs 60 are caused to thrust into biting engagement with the wheel body and thus resist any tendency toward torque turning of the cover in service. Inasmuch as the pairs of spurs at each leg of each of the spokes 51 extend in generally opposite peripheral directions, it will be apparent that the cover is held quite effectively against turning in either direction.

Although the spoke portion of the cover connecting the inner and outer cover members 31 and 53, is preferably substantially rigid, the diaphragm-like intermediate portion 48 affords tensioned resiliently flexible yielding responsive to the inward drawing.

In the modification of Figures 5, 6 and 7 a cover 61 is applied to the outer side of a wheel comprising a wheel body 62 having a central dished bolt on flange 63, an intermediate axially outwardly projecting annular nose bulge 64 and an outer peripheral attachment flange 65. The bolt on flange is adapted to be secured by means of bolts 67 to a hub flange 68 from which projects a wheel axle hub 69 through the customary central opening in the bolt on flange 63.

At its outer margin the wheel body is attached by means of the bolt on flange 65 to a base flange 70 of a tire rim, the attachment flange 65 being inset at uniformly spaced intervals to provide wheel openings 71. The tire rim is of the multi-flange drop center type having an outer side flange 72 an intermediate flange 73 and a terminal flange 74 and cooperating to support a pneumatic tire and tube assembly 75.

In the present instance the cover 61 comprises a substantially full disk type circular cover member 77 the central crown portion of which is centrally apertured and telescoped by a cylindrical axially inwardly extending flange 78 on a handle member 79 by which the flange 78 is rotatable within the crown of the cover. On the inner marginal portion of the flange 78 is formed a pair of radially outwardly extending similar dog flanges 80 by which retaining engagement is effected within respective spiral cam slots 81 in the outer end portion of a tubular adaptor member 82. The adaptor member has inner marginal radially outwardly projecting attachment flange structure 83 by which the adaptor is secured by the attachment bolts 67 to the bolt on flange 63.

The cover 61, similarly as the cover 15, is attached to the wheel under resilient tension, non-rotatably and enabling circulation of air therethrough. To this end, the cover mmeber 77 is preferably constructed as a stamped sheet metal disk having a generally concially shaped central or crown portion that is angularly joined to a radially outwardly extending intermediate diaphragm-like annular portion 84 connected at its outer margin with an intermediate annular axially outwardly projecting rib-like bulging portion 85 adapted to overlie the nose bulge 64 of the wheel body.

At the radially outer side of the intermediate rib formation 85, it slopes generally radially outwardly and axially inwardly into a dished annular outer portion 87 having at its outer margin a generally radially and axially outwardly extending outer marginal portion 88 arranged to bear against the terminal flange 74 of the tire rim and having an under turned marginal reenforcing and finishing flange 89. The dished portion 87 is adapted to extend into the annular groove defined between the tire rim and the nose bulge 64 of the wheel body.

For air circulation through the cover and also for retaining the cover against turning on the wheel, the portion of the cover intermediate the dished portion 87 and the bulging intermediate portion 85 of the cover member is provided with an annular series of uniformly spaced and preferably symmetrically formed louver-like pressed in portions 90. These portions 90 are preferably formed in adjacent pairs oppositely directed, toward one another and separated by an intervening strap-like strip 91 substantially concealing the gap between the companion louver-like members 90 but defining with the depressed louver-like members air gaps through the cover. At their innermost edges the louver portions 90 are arranged to engage against the wheel body 62 radially outwardly of the nose bulge 64 and thus hold the adjacent portion of the cover including the connecting straps 91 in spaced relation to the wheel body as best seen in Figures 6 and 7. The gaps afforded by the pressed in louver portions 90 are generally opposite the wheel openings 71 so that air circulation may effectively be accommodated.

For holding the cover against turning on the wheel, the inner edges of the louver elements 90 are provided with spur-like edges 92 that are as best seen in Figure 7 directed in opposite directions and effect a biting engagement with the contacted surface of the wheel body and thus resist torque imposed tendency toward turning of the cover in service.

In applying the cover 61 to the wheel, the outer edge portion thereof at the underturned flange 89 initially contacts the wheel at the tire rim, then the spur edges 92 of the pressed in louver elements 90 engage the wheel body. This relationship is indicated in the dash and full outline positions of Figure 6. Finally, the cover is placed under axially inward tension by turning down the central latching mechanism, thus placing the diaphragm-like intermediate portion 84 under resilient tension and thrusting the spur edges 92 firmly against the wheel body.

In order to close the central opening defined by the flange 78 a closure cap 93 may be secured in place on the handle member 79 at the juncture thereof with the flange 78.

In the modification of Figure 8, an arrangement is shown wherein the cover has outwardly pressed louver-like embossments 90' while an intermediate spacing strap-like strip 91' has generally axially inwardly and flaring spur-like edges 92' which engage against the adjacent surface of the wheel body 62' to hold the cover against turning on the wheel. It will be understood that other portions of the cover of Figure 8 may be similar to the cover of Figure 6.

In the modification of Figure 9, in each pair of louver-like elements 90" one louver-like element 90" is pressed outwardly while the other of the pair is pressed inwardly. A separating and connector strip 91" between the two louver-like elements affords air gap. The innermost of the louver elements 90" has its inner edge extremity formed to provide a turn preventing spur edge 92" engageable with the body of the wheel 62". The cover of Figure 9 may also embody substantially the features of the cover of Figure 6.

It will be appreciated that at least a pair of the oppositely offset louvers 90" will be generally opposite one of the wheel openings in the assembly, similarly as the pairs of louvers 90, and will thus be effective for creating flow of air through the passage provided by the wheel opening, such as the wheel opening 71 of Figure 6, to thus ventilate the brake drum with which the wheel is associated. The pair of louvers 90" thus associated with the wheel opening air passage creates flow of air through the passage while the wheel is rotating by reason of one of the louvers 90" being disposed to create pressure by picking up air and the other louver 90" being disposed to create a vacuum, the air flowing through the gap between the oppositely circumferentially directed edges of the oppositely offset louvers.

It will be observed that the cover disk member for the ventilating vehicle wheel has a plurality of holes therethrough with the lovers 90" of each pair extending over different portions of a hole and opening in opposite directions peripherally of the wheel and forming a passage through the hole for air, the flow of air through said passages being obtained while the wheel is rotating by reason of the louvers 90" opening in one direction creating a pressure by picking up air and the louvers 90" opening in the other direction creating a vacuum.

Of course, in the creating of air flow through the holes in the cover disk, air flow through the holes or openings in the wheel passages is similarly effected.

The modification shown in Figures 10 and 11 comprises a cover 95 applied to the outer side of a vehicle wheel comprising a wheel body 97 having an outer marginal attachment flange 98 secured to a base flange 99 of a tire rim. The base flange merges with a side flange 100 leading into an intermediate flange 101 that connects with a terminal flange 102. The flanges of the tire rim cooperate to support a pneumatic tire and tube assembly 103.

Attachment of the cover 95 to the wheel may be affected substantially like the covers 15 and 61 hereinabove described.

The cover 95 comprises a disk-type cover body 104 which has an intermediate depressed annular portion 105 which is adapted to fit in spaced relation into the groove between the tire rim and the wheel body 97 and merges with a marginal annular preferably convexly shaped portion 107. At its outer extremity, the marginal portion 107 has an underturned flange 108 which is adapted to lie in assembly opposite the terminal flange 102.

In order to retain the cover against turning on the wheel, the underturned flange 108 behind the outer marginal portion 107 of the cover has its inner margin formed with a plurality of turn-preventing sharp spurs 109. By preference the spurs 109 are formed from the flange 108 by slitting the margin of the flange and bending the edges formed by the slit generally axially inwardly as best seen in Figure 11 so that the corners thereby produced will provide the spurs 109. In assembly with the wheel the spurs 109 engage against the terminal flange 102 under axially inward resilient thrust tension against the cover and thereby bite into the terminal flange and retain the cover against turning.

In Figures 12 and 13 is shown a further modification wherein a cover 110 is secured to the outer side of a wheel including a body 111 having an intermediate annular nose bulge 112 and a central depressed or dished attachment flange 113 by which the wheel is adapted to be secured by means of attachment bolts 114 to a hub flange 115 of a vehicle axle structure. In its outer margin the wheel body 111 has an attachment flange 117 by which it is secured to a base flange 118 of a tire rim. At suitable intervals the attachment flange 117 has inset portions affording wheel openings 119.

The tire rim includes a side flange 120, an intermediate flange 121 and a terminal flange 122. The flanges of the tire rim cooperate to support a pneumatic tire and tube assembly 123.

The cover 110 preferably comprises a circular disk of sheet metal drawn to appropriate shape to provide a crown portion 124 merging with an intermediate diaphragm-like portion 125 that is integrally connected with an annular dished portion 127 that extends into the annular groove between the wheel body nose bulge 112 and the tire rim. At its radially outer side the dished portion 127 has an underturned marginal flange 128 which lies opposite the terminal flange 122.

In order to enable air circulation through the cover, and to afford turn preventing means on the cover, the intermediate portion 127 is provided with a series of radially extending slots 129 which may be uniformly provided in spaced relation. The margins of the slots are defined by longitudinal radially extending inturned reenforcing flanges 130. At their outer ends the flanges 130 are formed with sharp generally axially inwardly directed spurs 131 which in assembly engage against the tire rim adjacent juncture of the terminal flange with the intermediate flange. By preference the spurs 131 make at least initial contact with the wheel so that as the cover is applied to the outer side of the wheel the spurs 131 will thrust firmly and bitingly against the tire rim and thus thoroughly resist tendency toward turning of the cover on the wheel. The intermediate portion 125 of the cover will be placed under resilient diaphragm-like tension. A central turn on rotary portion 132 carried by the cover and having handle ears 133 is provided, similarly as the like structure on covers 15 and 61, for attaching the cover 110 to the wheel through the medium of an adaptor member 134.

It will be observed that in the cover 95 the spaced relationship maintained between the outer margin of the cover by the spur projections 109 will afford air circulation clearance between the margin and the cover through wheel openings that may be provided in the wheel at the attachment flange 98 of the wheel body. In the cover 110 the slots 129 afford air circulation through the cover.

It will be understood that modifications and variations may be effected without departing from the scope of the novel concepts of the present invention.

I claim as my invention:

1. In a wheel structure including wheel body and tire rim parts, a cover held on the wheel under axially inward tension, said cover having spur-like elements thereon in thrusting axially inward edgewise biting engagement with one of said wheel parts and resisting turning of the cover on the wheel.

2. In a wheel structure including tire rim and body parts, a cover member for disposition at the outer side of the wheel, means securing said cover member under axially inward tension against the wheel, said cover member having thereon generally axially inwardly directed retaining edge means for bitingly engaging one of said wheel parts under axially inward thrust under said tensioned engagement and resisting turning of the cover on the wheel.

3. In a wheel structure including tire rim and body parts, a cover member for disposition at the outer side of the wheel, means securing said cover member under axially inward tension against the wheel, said cover member having thereon generally axially inwardly directed retaining edge means engaging one of said wheel parts under axially inward thrust under said tensioned engagement and resisting turning of the cover on the wheel, said edge means comprising spur-like elements for bitingly engaging the body part.

4. In a wheel structure including tire rim and body parts, a cover member for disposition at the outer side of the wheel, means securing said cover member under axially inward tension against the wheel, said cover member having thereon generally axially inwardly directed retaining edge means engaging one of said wheel parts under axially inward thrust under said tensioned engagement and resisting turning of the cover on the wheel said edge means comprising spur-like corners on a marginal portion of the cover engaging the tire rim.

5. In a wheel structure including tire rim and body parts, a cover for disposition at the outer side of the wheel including radially inner and outer members connected together by spoke elements, and means for securing the cover under tension to the outer side of a wheel, said spoke elements having turn preventing spurs engaging one of said parts under generally axially inward thrust imposed by said securing means.

6. In a wheel structure including tire rim and body parts, a cover for disposition at the outer side of the wheel comprising a cover member having at the center turnable latch means, means engaging the wheel body and retainingly engageable by said latch means for holding the cover on the wheel, the cover having spoke-like structure thereon, said spoke-like structure having generally axially inwardly directed turn preventing spurs engaging one of said wheel parts to hold the cover against turning.

7. In a wheel structure including body and rim parts, a cover for disposition at the outer side of the wheel, comprising a cover member, means for holding the cover member on the wheel under resilient axially inward tension, said cover member having air circulation promoting louver portions pressed therefrom, said louver portions having turn preventing sharp edges engaging one of said parts in generally axially inward thrusting biting relation.

8. In a wheel structure including body and rim parts, a cover for disposition at the outer side of the wheel, comprising a cover member, means for holding the cover member on the wheel under resilient axially inward tension, said cover member having an underturned outer marginal flange provided with slits and turned edges extending angularly from the plane of said flange at said slits providing spur-like engagement against the tire rim part.

9. In a wheel structure including body and rim parts, a cover for disposition at the outer side of the wheel, comprising a cover member, means for holding the cover member on the wheel under resilient axially inward tension, said cover member having radial slots therein with margins defining the slots turned generally axially inwardly and affording edges projecting out of the plane of said cover member engageable in generally axially inwardly thrusting biting relation against a generally axially outwardly facing portion of one of said wheel parts to hold the cover against turning on the wheel.

10. In a wheel structure including a wheel body, a cover for disposition at the outer side of the wheel comprising a cover member having a central latch structure, a member carried by the wheel body and retainingly engageable by said latch structure, said latch structure comprising a bar providing oppositely extending arms, said engageable member having generally spiral cam surfaces thereon engageable by said arms, and means for turning said latch structure to engage said arms in cover retaining relation with said cam surfaces, said latch structure also having a latch bolt extending transversely to said bar and reciprocable into and out of latching engagement with a portion of said retaining member comprising means for holding the bolt against lateral movement circumferentially of the cover and thereby holding the latch structure against unintentional turning out of said cover-retaining relation.

11. In a cover for disposition at the outer side of a vehicle wheel, a central cover portion, an intermediate cover portion, and a radially outer cover portion, said central cover portion having means for attachment to a wheel, said intermediate cover portion being axially flexible under resilient tension, and said outer cover portion having spur-like axially inwardly directed means for edgewise bitingly engaging a wheel part to hold the cover against turning thereon.

12. In a cover for disposition at the outer side of a vehicle wheel, a central cover portion, an intermediate cover portion, and a radially outer cover portion, said central cover portion having means for attachment to a wheel, said intermediate cover portion being axially flexible under resilient tension, and said outer cover portion having spur-like axially inwardly directed means for engaging a wheel part to hold the cover against turning thereon, said spur-like means comprising turned in corners at the extremities of spoke-like structures on the cover.

13. In a cover for disposition at the outer side of a vehicle wheel, a central cover portion, an intermediate cover portion, and a radially outer cover portion, said central cover portion having means for attachment to a wheel, said intermediate cover portion being axially flexible under resilient tension, and said outer cover portion having spur-like axially inwardly directed means for engaging a wheel part to hold the cover against turning thereon, said spur-like means being formed on louver elements on the cover.

14. In a cover for disposition at the outer side of a vehicle wheel, a central cover portion, an intermediate cover portion, and a radially outer cover portion, said central cover portion having means for attachment to a wheel, said intermediate cover portion being axially flexible under resilient tension, and said outer cover portion having spur-like axially inwardly directed means for engaging a wheel part to hold the cover against turning thereon, said spur-like means comprising turned in edges at slots in the cover member.

15. In a cover for disposition at the outer side of a vehicle wheel, a central cover portion an intermediate cover portion and a radially outer cover portion, said central cover portion having means for attachment to a wheel, said intermediate cover portion being axially flexible under resilient tension, and said outer cover portion having spur-like axially inwardly directed means for bitingly engaging a generally axially outwardly facing wheel part to hold the cover against turning thereon, said spur-like means being provided on a turned under flange on the cover member.

16. In a cover for disposition at the outer side of a vehicle wheel, means for retaining the cover on a wheel, and spur-like edges directed inwardly of the cover for axial thrusting biting engagement with a wheel part.

17. In a wheel structure including a wheel body, a cover for disposition at the outer side of the wheel comprising a cover member having a central latch structure, a tubular member carried in axially outwardly directed relation by the wheel body and retainingly engageable by said latch structure, said structure comprising a bar providing oppositely extending arms having their ends on a diameter less than the inside diameter of the axially outer portion of said tubular member, said tubular member having a pair of radially inwardly directed generally spiral cam flanges with axially inwardly directed surfaces thereon engageable by said arms, and means for turning said latch structure to engage said arms in cover-retaining axially inwardly drawn relation with said cam surfaces for holding the cover on the wheel.

18. In a ventilating vehicle wheel, a disk member having holes therethrough and louvers at opposite sides of said disk member arranged in pairs with the louvers of each pair opening in opposite directions peripherally of the wheel and forming air circulation passages through said holes, the flow of air through said passages being obtained while the wheel is rotating by reason of the louvers opening in one direction creating a pressure by picking up air and the louvers opening in the other direction creating a vacuum.

19. A vehicle wheel comprising a wheel disk having a hole therethrough, and means for creating a flow of air through the hole comprising louvers associated with the hole and opening in opposite directions peripherally of the wheel, the flow of air through said hole being obtained while the wheel is rotating by reason of one of said louvers creating pressure by picking up air and the other louver creating vacuum.

20. A vehicle wheel for ventilating a brake part comprising a wheel body having a passage therethrough for air, and means for creating flow of air through the passage comprising a pair of louvers associated with the passage, the flow of air through said passage being obtained while the wheel is rotating by reason of one of the louvers being disposed to create pressure by picking up air and the other louver being disposed to create a vacuum.

21. In a wheel structure including a multi-flange tire rim and a wheel body supporting the tire rim, a circular wheel cover for disposition over the outer side of the wheel, provided with a radially outer portion for overlying the tire rim, and having means for retaining the cover in predetermined position on the wheel against both axial and circumferential displacement, said means including an annular flange structure carried by the cover and concealed behind said radially outer portion of the cover for opposing the tire rim, said flange structure having a circumferential series of portions thereon integral in one piece therewith provided with substantially sharp cut edges angled generally toward the tire rim for engagement in tensioned biting gripping relation with an opposing surface of the tire rim, some of said sharp edges being directed generally in one circumferential direction and others of the sharp edges being directed generally in the opposite circumferential direction so as to retain the cover against torque-induced turning displacement in either rotary direction of revolution of the wheel in service.

References Cited in the file of this patent

UNITED STATES PATENTS

| | | |
|---|---|---|
| 1,665,437 | Booth | Apr. 10, 1928 |
| 1,929,701 | McCalister | Oct. 10, 1933 |
| 1,949,317 | Lyon | Feb. 27, 1934 |
| 2,175,044 | Van Halteren | Oct. 3, 1939 |
| 2,308,617 | Lyon | Jan. 19, 1943 |
| 2,329,945 | Schatzman | Sept. 21, 1943 |
| 2,331,259 | Whitten | Oct. 5, 1943 |
| 2,368,228 | Lyon | Jan. 30, 1945 |
| 2,729,510 | Lyon | Jan. 3, 1956 |

FOREIGN PATENTS

| | | |
|---|---|---|
| 436,894 | Italy | June 16, 1948 |